Nov. 21, 1950     J. H. MANLEY     2,531,144
COINCIDENCE PROPORTIONAL COUNTER
Filed Dec. 13, 1945
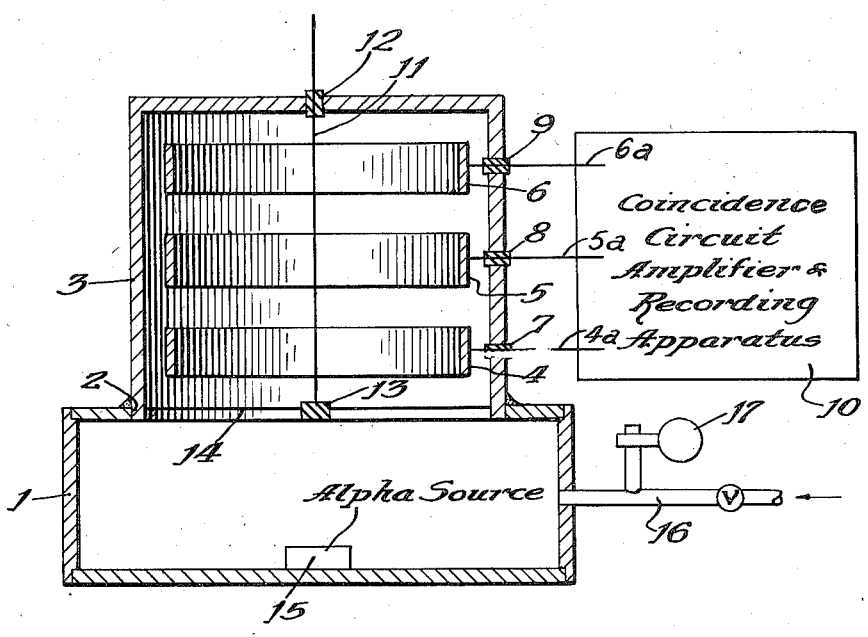
Witnesses:
Inventor:
John H. Manley
By:
Attorney Patented Nov. 21, 1950

2,531,144

UNITED STATES PATENT OFFICE 2,531,144

COINCIDENCE PROPORTIONAL COUNTER

John H. Manley, Urbana, Ill., assignor to the United States of America as represented by the United States Atomic Energy Commission Application December 13, 1945, Serial No. 634,861

7 Claims. (Cl. 250—27.5)

The present invention relates to a coincidence proportional counter, more specifically to one which is especially adapted to measure the energy spectrum of an ionizing source.

In the past, various types of devices have been employed to measure the range or energy spectrum of emission particles emanating from a radioactive source such as a source of alpha particles or recoil protons which cause ionization in a gas-filled chamber. These devices generally have the common disadvantage of being cumbersome in structure and often not sufficiently reliable in operation.

An object of the present invention, therefore, is to provide a novel, relatively simple and reliable coincidence proportional counter adapted for energy spectra measurements of particle-emitting radioactive sources.

A more specific object of the present invention is to provide a novel coincidence proportional counter having a plurality of collecting electrodes so disposed as to measure the range or energy spectrum of an ionizing, particle-emitting source, such as an alpha source or a source of recoil protons as obtained from the bombardment of paraffin with neutrons.

Other objects and advantages will become apparent from a study of the following specification taken with the accompanying drawing wherein:

The single figure is a longitudinal sectional view of a coincidence proportional counter chamber wherein the associated circuit is shown schematically.

Referring more particularly to the drawing, numeral 1 denotes a flat box-like receptacle or chamber of brass or other suitable material having a circular opening 2 in the top wall thereof and an upstanding cylindrical chamber portion 3 with an open bottom closely fitting in and sealed to the edge defining the circular opening 2 to form an enclosed chamber. Three collecting electrodes, 4, 5, and 6 in the form of cylindrical rings are axially spaced from one another and insulatingly supported from the chamber portion 3 by any suitable means, such as spaced insulators (not shown). It should be understood that while three collecting electrodes are shown, two or any larger number may be used depending upon the gradations desired of the energy spectrum measurements to be made.

The three collecting electrodes 4, 5, and 6 are connected by wires 4a, 5a, and 6a, respectively, to a coincidence circuit amplifier and recording apparatus of any suitable well known type, which amplifier and recording apparatus, per se, form no part of the present invention, hence are illustrated by block diagram 10. Insulators 7, 8, and 9 insulatingly support the wires 4a, 5a, and 6a, respectively, in their passage through the wall of the chamber portion 3.

A central wire 11 extends axially of the collecting electrodes and is supported at the ends thereof and insulated from the chamber by means of insulators 12 and 13. Insulator 13 is held by a cross wire 14 extending across the open lower end of the cylindrical chamber portion 3 for maintaining central wire 11 axially of the cylindrical chamber portion and of the collecing electrodes thereby maintaining a constant geometry. A source of positive, high voltage is applied to central wire 11 so that it constitutes a high voltage electrode. The cooperating collecting electrodes 4, 5, and 6 are maintained at near ground potential, and hence, they may be considered in effect negative electrodes.

The chamber is filled with an ionizable gas such as argon, or some other rare gas. At the bottom of the chamber is placed a radioactive source 15 such as a source which emits alpha particles or a source which emits recoil protons such as is obtained from the bombardment of paraffin with neutrons or, in fact, any source which will emit radiant particles causing ionization of the gas and whose ionizing range or energy spectrum is to be measured.

The chamber is provided with a gas inlet fitting or conduit 16 for supplying and releasing gas, to which may be connected a pressure gauge 17 to indicate the gas pressure.

In operation, assuming alpha particles emerge from the source 15 with various amounts of energy, then their ranges will vary accordingly. As is well known in the art, such particles will ionize the argon gas and produce current impulses to be transmitted through and amplified by the coincidence amplifier circuit after detection by electrodes 4, 5 and 6. The range of a particle, of course, is determined not only by the energy it has on emission but by the gas pressure maintained within the chamber. A particle having sufficient energy to travel as far as the middle collecting electrode 5 will cause a coincidence pulse in the counting circuits associated with the first and second collectors. Similarly, a particle with sufficient energy to reach the third or furthermost collecting electrode 6 will cause a coincidence pulse to be recorded in each of the three counting circuits.

Thus it will be seen that by suitably adjusting the gas pressure and noting the number of coincidences recorded in the three counting circuits a measurement of the energy spectrum may be obtained. In using more energetic sources the pressure is increased so that the range of the particles will be decreased and confined substantially to the vicinity of the collecting electrodes.

It will be seen, therefore, that there has been provided an efficient and relatively simple proportional counter that is adapted to accurately measure the energy spectrum of alpha and similar particles emitted by an ionizing source.

It will be apparent that modifications will be readily suggested to those skilled in the art from a study of the specification, which modification would come within the spirit and purview of the present invention, and, therefore, the invention should not be limited except insofar as set forth in the following claims.

What is claimed is:

1. A proportional counter for measuring the energy spectrum of a particle-emitting ionizing source comprising a chamber containing argon gas, a wire-like electrode suspended centrally of said chamber, a cross wire for maintaining said electrode in its central position, a source of positive high voltage connected to said electrode, a plurality of ring-shaped collecting electrodes surrounding and coaxially disposed with respect to said wire-like electrode, a coincidence amplifier circuit to which said ring-like electrodes are separately connected, said chamber having a bottom portion supporting an alpha particle emitting source below said wire-like electrode and said collecting electrodes and substantially axially thereof, conduit means for admitting gas into said chamber, and a pressure gauge connected to said conduit means for indicating the gas pressure.

2. A radiation counter comprising, in combination, a plurality of axially spaced coaxial ring-like collecting electrodes, a wire-like electrode axial of said collecting electrodes, separate mutually insulated conducting leads connected to each of said collecting electrodes, and means for propagating ionizing particles substantially axially of the collecting electrodes, whereby the passage of a particle through successive collecting electrodes causes a current pulse through each of said successive electrodes.

3. In radiation energy measurement apparatus: a radiation counter comprising, in combination, a chamber filled with an ionizing medium, an elongated electrode within said chamber, and a plurality of collecting electrodes spaced from said elongated electrode within said chamber, said collecting electrodes being spaced from each other in the direction of elongation of said elongated electrode, and being mutually insulated and insulated from said elongated electrode; means for propagating ionizing particles substantially in the direction of elongation of said elongated electrode; and a coincidence circuit connected by separate connections to said collecting electrodes; whereby the extent of occurrence of coincident current pulses to successive collecting electrodes constitutes an indication of the energy of said ionizing particles.

4. In radiation energy measurement apparatus: a radiation counter comprising, in combination, a chamber filled with an ionizing medium, a wire-like electrode within said chamber, a plurality of ring-like collecting electrodes surrounding said wire-like electrode within said chamber, said collecting electrodes being spaced from each other along said wire-like electrode, and being mutually insulated and insulated from said wire-like electrode; means for propagating ionizing particles substantially axially of the collecting electrodes; and a coincidence circuit connected by separate connections to said collecting electrodes; whereby the extent of occurrence of coincident current pulses to successive collecting electrodes constitutes an indication of the energy of said ionizing particles.

5. A radiation counter comprising, in combination, a chamber filled with an ionizing medium, an elongated electrode within said chamber, a plurality of collecting electrodes spaced from said elongated electrode within said chamber, said collecting electrodes being spaced from each other in the direction of elongation of said elongated electrode, separate conducting leads connected to each of said collecting electrodes, and means for propagating ionizing particles substantially axially of the collecting electrodes, whereby the extent of occurrence of current pulses to successive collecting electrodes constitutes an indication of the energy of said ionizing particles.

6. A radiation measuring device comprising, in combinaton, a chamber filled with an ionizing medium, a wire-like electrode within said chamber, a plurality of ring-like collecting electrodes surrounding said wire-like electrode within said chamber, said collecting electrodes being spaced from each other along said wire-like electrode, and said collecting electrodes being mutually insulated and insulated from said wire-like electrode, and means for propagating ionizing particles substantially axially of the collecting electrodes, whereby the passage of an ionizing particle through each successive collecting electrode induces a current pulse to that electrode.

7. A radiation measuring device comprising, in combination, a chamber filled with an ionizing medium, an elongated electrode within said chamber, a plurality of collecting electrodes spaced from said elongated electrode within said chamber, said collecting electrodes being spaced from each other in the direction of elongation of said elongated electrode, and said collecting electrodes being insulated from each other and from the elongated electrode, and means for propagating ionizing particles in the direction of elongation of said elongated electrode, said means propagating the particles between the elongated electrode and the collecting electrodes, whereby the extent of occurrence of current pulses to successive collecting electrodes constitutes an indication of the energy of said ionizing particles.

JOHN H. MANLEY.

REFERENCES CITED

The following references are of record in the file of this patent:

UNITED STATES PATENTS

| Number | Name | Date |
|---|---|---|
| 2,094,318 | Failla | Sept. 28, 1937 |
| 2,349,753 | Pontecorvo | May 23, 1944 |
| 2,397,071 | Hare | Mar. 19, 1946 |
| 2,405,572 | Friedman | Aug. 13, 1946 |